MAGNETRON-TRAVELING WAVE TUBE AMPLIFIER

Filed Oct. 22, 1954

INVENTOR.
Carmen Louis Cuccia
BY
William A. Zalesak
ATTORNEY

June 7, 1960 C. L. CUCCIA 2,940,006

MAGNETRON-TRAVELING WAVE TUBE AMPLIFIER

Filed Oct. 22, 1954 2 Sheets-Sheet 2

INVENTOR.

Carmen Louis Cuccia

BY

William A. Zalesak

ATTORNEY

United States Patent Office 2,940,006

Patented June 7, 1960

2,940,006

MAGNETRON-TRAVELING WAVE TUBE AMPLIFIER

Carmen Louis Cuccia, Princeton, N.J., assignor to Radio Corporation of America, a corporation of Delaware Filed Oct. 22, 1954, Ser. No. 463,960

16 Claims. (Cl. 315—39.3)

This invention relates to traveling wave tube amplifiers. More particularly it relates to traveling wave tube amplifiers utilizing magnetron principles and wherein a traveling azimuthal field interacts with a spirally rotating beam of electrons.

In a standard magnetron, cylindrical geometry is used. The resonators utilized within the magnetron are usually completely coupled so that there is substantially no separation between the input and the output thereof. Efficient operation of this arrangement allows only for oscillation within the magnetron; amplification of a signal cannot be had. Attempts at separating the input and output have not succeeded to the extent that amplification may be effectively achieved. Then, too, conventional magnetron geometry ordinarily requires what is known as "strapping" in order to prevent mode jumping and to restrict operation to the $\pi$ mode with respect to the desired frequency. However, the compact geometry of the magnetron offers many advantages which are very desirable. For example, the magnetron is capable of operating at relatively high frequencies utilizing relatively high current densities.

It is thus a principal object of the invention to incorporate the compactness and the efficiency of the magnetron geometry in a tube which is of the traveling wave type and which is capable of amplifier action.

More specifically, it is an object of the present invention to provide a traveling wave tube with improved means for utilizing a relatively high current density within a relatively small region.

It is another object of the present invention to provide an improved traveling wave tube utilizing magnetron geometry and which substantially obviates space-charge-depression-of-potential effects.

It is a further object of the invention to provide an improved traveling wave tube structure which is capable of operating at relatively high frequencies at a relatively high current density.

It is yet another object of the invention to provide an improved amplifier tube utilizing magnetron geometry and in which mode jumping is eliminated.

It is a further object of the invention to provide a traveling wave tube which utilizes the compact geometry of a magnetron and which achieves amplification within a relatively small axial region of the tube.

It is a still further object of the invention to provide an amplifier structure utilizing magnetron geometry and wherein the grouping of an electron stream into components having an angular velocity substantially equal to the angular phase velocity of a traveling wave is effected only in the $\pi$ mode with respect to the desired frequency.

In order to accomplish these and other objects, this invention provides a traveling wave tube structure in which a beam of spiralling electrons interacts with an azimuthal traveling wave electric field produced along a helix within the tube to effect amplification. A stream of electrons from a cathode at one end of the tube is accelerated along the axis of the tube with a predetermined axial velocity. The electrons are also simultaneously electrostatically accelerated in a direction normal to the axis. Means are provided for producing a magnetic field which curves the electron trajectories so that the electrons describe a helical or spiral path with an axial component of motion and an azimuthal component of motion due to the magnetic field. The spiral path thus described by each electron in the stream of electrons is one which is a hybrid between the circular path described by electrons in a conventional magnetron and the axially linear path described by electrons in a conventional, linear traveling wave tube. Magnetron-type anode vanes are positioned along the helix at points thereon corresponding substantially to $\pi$ mode intervals for the frequency of the traveling wave to be amplified. The alternating potentials produced at the vanes cause the stream of electrons to break up into in-phase and out-of-phase groups. The in-phase groups have angular phase velocities substantially equal to the angular phase velocity of the azimuthal traveling wave field produced on the anode vanes. Favorable interaction occurs between the azimuthal traveling wave and the in-phase groups of electrons. The in-phase groups give up energy to the traveling wave in a manner similar to that in which in-phase groups of electrons in a magnetron give up their energy. But here, because the input and output of the traveling wave tube are axially spaced from each other, the input and output are not coupled. Thus amplification rather than oscillation is effected. And as back coupling other than that realized from electron and field interaction is eliminated, an automatic strapping is effected. Also, the grouping of the electrons into in-phase and out-of-phase groups occurs in optimum fashion in the $\pi$ mode with respect to the frequency of the traveling wave.

While the invention is pointed out with particularity in the appended claims it may be best understood from the following detailed description and drawings where like numerals refer to like parts. The embodiments described are presented solely for illustrative purposes and not by way of limitation.

In the drawings:

Figure 1 is a sectional view of a magnetron-traveling wave tube amplifier according to the invention. The section shown is taken through the longitudinal axis of the tube.

Figure 2 is a sectional view taken on line 2—2 of the tube shown in Figure 1. While Figure 1 is itself a sectional view, Figure 2 is a transverse section depicting not only the portion of the tube shown in Figure 1 but also includes the transverse section of the portion of the tube which was omitted from the drawing in that figure.

Figures 1, 2:
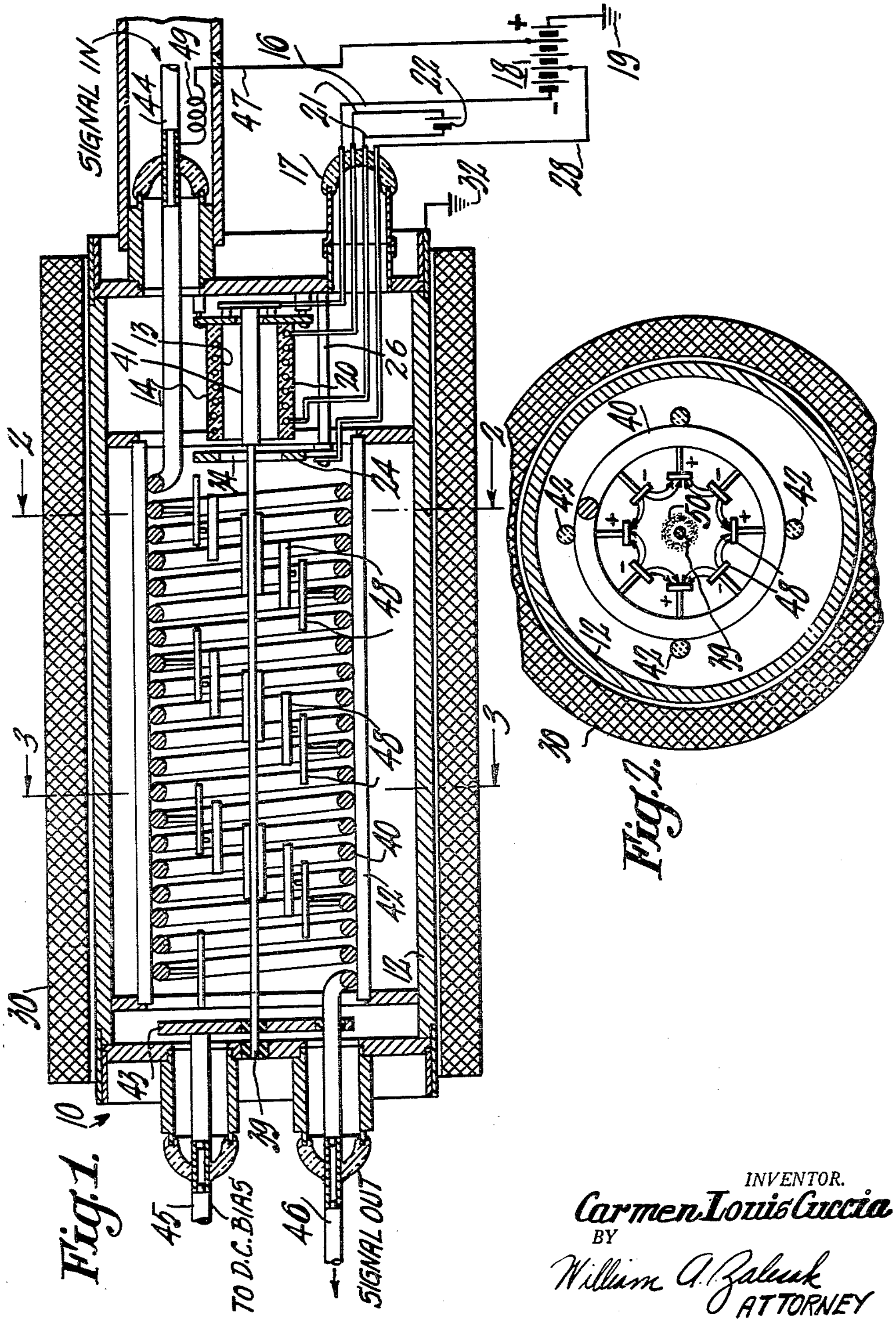

Referring now to the drawing in greater detail there is shown in Figure 1 a magnetron-traveling wave tube structure 10 embodying the invention. Within an electrically conductive envelope 12, which may be of a magnetically transparent material such as copper, are the various internal tube elements. A relatively dense stream of electrons is thermionically emitted from the inside surface 13 of a hollow cathode 14. The cathode 14, which is provided with an electron emissive coating, is connected to a lead 16 which is in turn connected, through a tube terminal 17, to the negative side of a power source 18. The cathode is provided with a heater 20 which is connected through leads 21 to a heater power supply 22. As shown in the drawing, the power source 18 is grounded at its positive terminal 19. Electrons from the cathode are accelerated toward an accelerating anode 24 due to a positive bias on it. The anode is supported in its position near the cathode by a non-conductive support arm 26. A positive bias is supplied to the anode 24 through a lead 28 which is connected to a more positive portion of the power source 18 than the cathode. A solenoid coil 30 produces a longitudinal magnetic field along the axis of the tube 10. As the magnetically transparent, conductive envelope 12 is grounded at a ground terminal 22 in order to avoid high potentials on associated transmission lines, the envelope is maintained at a high positive potential with respect to the cathode. Electrons pass through an aperture 34 in the anode 24 in a stream and drift axially toward a relatively high positively biased collector 43. As they travel from the cathode toward the aperture 34 the electrons acquire a transverse component of velocity in a direction perpendicular to the axis. As the transverse velocity of the electrons move them across the longitudinal magnetic field produced by the coil 30, the electrons are caused to move in substantially helical paths with an azimuthal velocity around the longitudinal axis of the tube. The azimuthal velocity of spiraling electrons is defined to be the angular speed of the electrons in their spiral path in a direction around and along the spiral. The electrons taken together comprise a hollow, substantially cylindrical cloud which rotates and at the same time moves along the longitudinal axis away from the cathode.

A helical conductor 40, hereinafter referred to as the helix, is provided within the tube. As is known, a signal wave may be propagated along a helix. Then, while the signal wave may have a relatively high velocity along the spiraling path of the helix as compared to the axial velocity of the electrons, the velocity of the signal along the longitudinal axis of the helix is far less. The longitudinal or axial velocity of the signal wave on the helix is determined by the diameter and the pitch of the helix. As seen in Figure 1 the helix 40 is supported by non-conductive rods 42 which may, for example, be of a ceramic. The helix is provided with an input 44 and an output 46. A lead 47 is joined to the helix by means of a connection to the input 44 and is energized by the power supply 18 for establishing the proper helix potential. A coil 49 is provided in series with the lead 47; the coil provides an inductance which blocks the flow of a radio frequency signal but which permits the flow of direct current bias to the coil. A central conductor 39 extending along the tube axis and the collector electrode 43 at one end of the tube are provided for purposes to be described below. The central conductor 39 is electrically connected, at one end thereof, to the cathode 14; the conductor is insulated from the tube envelope at the other end. The portion of the conductor 39 within the hollow cathode 14 is provided with a non-conductive sleeve 41 to insulate the conductor at that region from the dense stream of electrons emitted from the cathode. The collector electrode 43 is positioned at the end of the tube remote from the cathode and connected back to the cathode by means of an external lead 45.

Elongated field forming vanes 48 are affixed to the helix at predetermined points thereon. As shown in Figure 1, the vanes 48 are oriented parallel to each other and to the helix axis in a hollow cylindrical array to permit the establishing of circumferential electric fields therebetween by the signal wave traveling along the helix. The separation between the points at which the vanes are fixed represents the points along the helix which, for a given signal input frequency, bear a relationship to the distance between positive and negative voltage nodes for that frequency. If a $\pi$ mode relationship is desired, the vanes may be spaced on the helix at points representing separation between $\pi$ mode nodes for that given frequency. If, for example, a helix were chosen with a pitch corresponding to two turns per wavelength, successive wires would have adjacent points which would be at alternately positive and negative potentials. But as shown in the drawing, the pitch is chosen corresponding to slightly less than two turns per wavelength. If the vanes are to be connected to points on the helix representing voltage nodes, the vanes must be connected to the helix at points thereon slightly less than one full turn apart, so that the electrical length of the radio frequency path between adjacent vanes will be about one half wavelength. The vanes on the helix, considered as a whole, thus define a helical system of vanes having a helical sense opposite to the helix turns. This helical system is shown in the drawing and the pitch of the physical vane system configuration, as distinguished from the pitch of the electrical signal wave along the helix, is greater than the pitch of the turns which make up the helix. The pitch of the vane system shown is six times the helix pitch. As will be explained below, the spiraling stream of electrons has a physical, spiral configuration substantial equal to that of the vane system. Interaction is effected between the electrons and the circumferential electric on the vanes so as to resolve the stream of spiralling electrons into groups. At the same time, the electrons in the spiral stream have an axial velocity substantially equal to the axial velocity of the signal wave on the helix. The vanes 48 constitute loading elements equally spaced around the inner periphery of the helical conductor 40.

Figure 3:
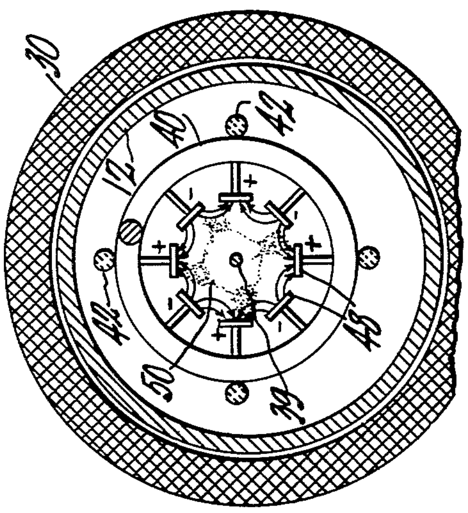
Figure 3 is a sectional view taken on line 3—3 of the tube shown in Figure 1. Here, too, a complete transverse section of the tube is shown while the view shown in Figure 1 is a longitudinal section.

Referring now to Figure 2 there is seen a sectional view of the structure shown in Figure 1. The view of Figure 2 is taken through the helix and near the cathode. As previously explained, the electrons acquire a transverse component of velocity. This component of velocity together with the longitudinal magnetic field give to the electron stream 50 an azimuthal velocity in a clockwise spiral as viewed from the cathode. The vanes 48 are also oriented in a clockwise direction. The electrons are caused to follow helical paths with substantially the same axial and angular velocities as an azimuthal wave traveling along the helical vane system, which wave may be considered a component of the signal wave traveling along the turns of the helix itself. The angular velocity of the electrons and the azimuthal vane wave is substantially less than that of the helix wave. As is seen in Figures 2 and 3 successive vanes are at alternately positive and negative potential peaks. The longitudinal motion of the electrons is not appreciably affected by the fields produced by the vanes. The phase relation between the electrons in the stream and the traveling signal wave is automatically adjusted for optimum interaction. At the start of the path the electrons travel in a continuous stream. Through the operation of the same phenomenon as in the conventional magnetron, the electron stream becomes grouped into in-phase and out-of-phase components. The in-phase groups of electrons have the proper angular phase relation to the signal wave on the helix to impart energy to it; energy is transferred from the electrons to the signal wave, or more properly to the electric field of the wave. This results in an increase in the energy level of the signal wave, corresponding to amplification of that wave, and a corresponding increase in the diameter of spiral of the electrons produced by the radial direct current field between the central conductor 39 and the helical conductor 40 and attached vanes 48. Thus, the electrons will describe paths increasingly closer to the vanes and continue to give up energy to the traveling wave field as they pass through it. The electrons continue to increase the diameter of their spiral until they either impinge upon and are captured by the vanes or reach the collector 43. The out-of-phase groups of electrons, those which tend to absorb energy from the wave, have a decreasing azimuthal velocity as they absorb energy. Thus they quickly experience a reduction in the diameter of their spiral path and drift toward the tube axis.

The field of the traveling wave on the helix extends only a relatively short distance inward, and the in-phase groups remain within that field. However, the out-of-phase groups with the decreased spiral radius drift inwardly out of the vicinity of the field of the wave, usually within a fraction of a complete turn in the spiral path. When the out-of-phase groups are out of the field of the wave they do not take energy from it. Thus, on the average, the in-phase groups of electrons are in the field of the wave for a longer period of time than the out-of-phase groups. Those out-of-phase electrons which reach the central conductor 39 along the axis of the tube, as shown in Figure 1, may be captured by that conductor. The collector 43, which is at the end of the tube remote from the cathode, intercepts the in-phase electrons which may not have been captured by the vanes as well as the out-of-phase electrons which were not collected by the center conductor. The collector is connected back to the cathode so as to return the electrons back to it. The collector may be connected to the cathode through a source of positive bias in order to better attract the in-phase electrons.

In Figure 3 the grouping of the electrons is illustrated. A stream of electrons is shown in which the stream has been grouped into in-phase and out-of-phase components. The stream at this point is seen to resemble a four-armed cloud of electrons made up of four groups of in-phase electrons separated by relatively small groups of out-of-phase electrons. As the arms of the electron cloud represent portions of the electron stream which were emitted from the cathode at different times, the separate arms are actually axially spaced from each other in a spiral. Since the arms rotate with the radio frequency field component they continue to spiral down the tube axis away from the cathode. The cloud shown has the arms thereof separated according to the $\pi$ mode; i.e. the successive vanes have alternately positive and negative voltage peaks.

Figure 4:
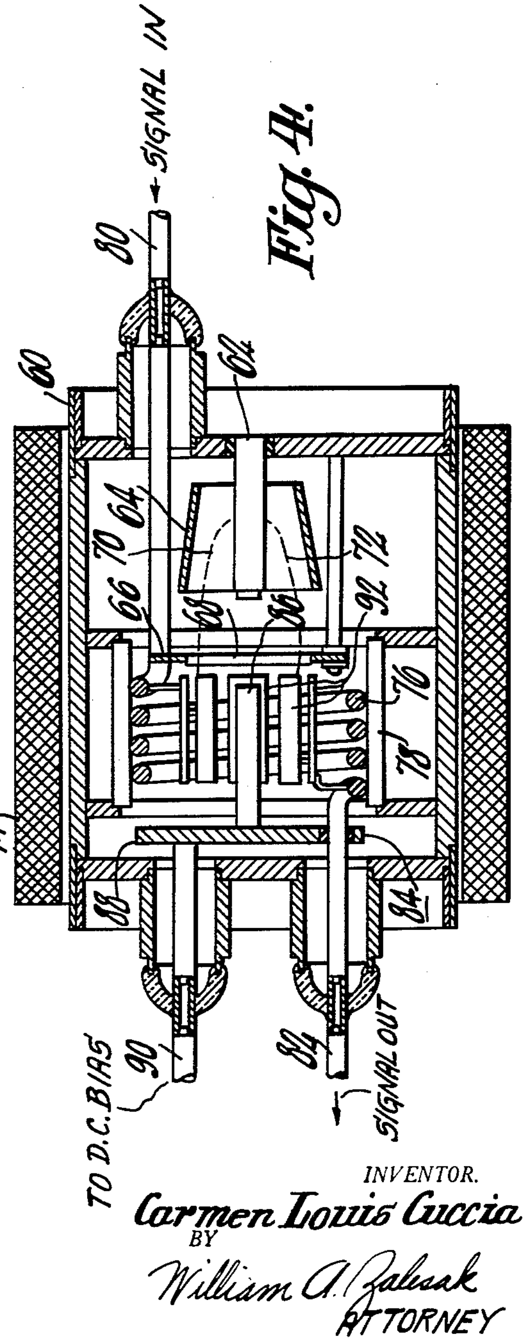
Figure 4 is a longitudinal view in section of a magnetron-traveling wave tube amplifier utilizing another embodiment of the invention.

In Figure 4, there is shown a compact magnetron-traveling wave tube employing another embodiment of the invention and utilizing a cathode structure different from that described in Figure 1. Within a tube envelope 60, which is of a magnetically transparent material, and at one end therein is positioned a cathode 62. The cathode has an outer surface with an electron emissive coating thereon. The cathode is thus able to provide a supply of electrons. A hollow first accelerating anode 64 in the shape of a section of an open-ended cone is positioned around and concentric with the cathode. A second accelerating anode 66, in the shape of a ring, is positioned co-axial with the cathode but spaced along the axis from it. The cathode is connected to one terminal of a power source (not shown). The first anode is connected to a terminal of the power source which is at a higher positive potential than that to which the cathode is connected. The second accelerating anode 66 is connected to a source of a higher positive potential than the first anode 64. The connections from the various elements of the tube in Figure 4 to external power sources are similar to those shown in Figure 1.

A solenoid coil 74 is positioned around the tube envelope. This coil has a length substantially equal to the length of the envelope. The coil produces a magnetic field having a portion thereof extending within and parallel to the axis of the tube. This magnetic field has an intensity of a magnitude to produce the desired transverse components of velocity of the electrons which issue from the cathode 62.

Electrons emitted from the cathode are accelerated by the first accelerating anode 64 toward this anode and transverse to the magnetic field of coil 74. During their journey toward the first accelerating anode 64 the electrons are subjected to a greater acceleration toward the second accelerating anode 66 due to the higher positive potential on it. The electrons thus described a spiral trajectory in the magnetic field with a velocity having a component of motion, due to the acceleration by the second accelerating anode 66, in a longitudinal direction, parallel to the tube axis on which the cathode lies, and a component of motion, due to the acceleration by the first accelerating anode 64, in a plane normal to that axis. The electrons, which issue forth in a stream, follow a spiral path through an aperture 68 in the second anode. The envelopes of the spiral paths of two electrons, shown in dotted lines 70 and 72, are representative of envelopes of the paths followed by substantially all the electrons from the cathode.

A helical conductor 76 is supported within the tube by non-conductive rods 78. An input 80 and an output 82, similar to the input and output shown in Figure 1, are provided at opposite end of the tube and connected to the helical conductor at its opposite ends. Such a helical conductor is adapted to propagate an electromagnetic signal wave thereon in the form of a helically-oriented traveling wave which has a velocity component along the axis of the tube which is less than the velocity of the wave on the conductor.

The helically traveling electrons thus have an azimuthal velocity around the tube axis and a prescribed axial component of velocity along the tube axis. The axial component of velocity of the stream in this embodiment is independent of the axial component of velocity of the signal wave on the helix.

As is also provided in the tube shown in Figure 1, the embodiment described in Figure 4 is shown with a collector electrode 84 having one portion thereof in the form of a rod 86 within the helical conductor 76 and lying on the axis of the tube and another portion thereof in the form of a disc 88 at the end of the tube remote from the cathode. The collector electrode 84 is provided with a lead 90 by means of which electrons collected by the electrode may be returned to the cathode through a connection (not shown) external the tube. The collector electrode may be biased with a positive potential with respect to the cathode to better collect electrons not otherwise collected by the various elements within the tube. However, the collector electrode may be omitted from the tube. But as this would result in a less efficient operation of the tube, this mode of operation (without the collector electrode) is not preferred.

For the purposes explained above, elongated field forming vanes 92 are coupled to the helical conductor 76 at points thereof corresponding to opposite polarity peaks of the signal on the conductor. In this embodiment, while the vanes extend inwardly of the conductor from different points along the axis, the vanes are co-extensive and are positioned with respect to each other such that the vane system describes a hollow cylindrical orientation within the conductor. The signal wave traveling along the helical conductor 76 produces an azimuthal wave traveling along the vanes 92 with an angular velocity substantially less than that of the signal wave, as in Figures 1–3. However, the azimuthal wave in Figure 4 follows a circular path along the cylindrical array of vanes, instead of a helical path as in Figures 1–3. The electrons are grouped into in-phase and out-of-phase components by the circumferential electric fields of the azimuthal wave on the vanes 92, and the in-phase groups interact with the azimuthal wave to produce amplification as described for Figures 1–3. The electrons may be collected by the vanes 92 in this embodiment and give rise to electron-field interactions similar to those produced in cylindrical magnetrons with the exception that amplification of the input signal is produced instead of oscillation because the vane system is not re-entrant.

It will be apparent from the foregoing description of a magnetron-traveling wave tube amplifier that a novel and advantageous tube is disclosed which is capable of amplifier operation at relatively high frequencies at relatively high current densities.

What is claimed is:

1. A traveling wave tube structure having means for propagating an azimuthal traveling wave along a helical path within said structure with a predetermined angular phase velocity, means including a cathode adjacent to one end and outside of said propagating means for projecting therealong a stream of electrons having helical motion along said helical path with substantially the same angular velocity as said wave, said propagating means including a series of vanes disposed along the path of said electrons for grouping said electrons into in-phase and out-of-phase components and for extracting energy from said in-phase components.

2. A traveling wave amplifier tube comprising means, including a hollow cylindrical array of circumferentially-spaced axially-extending conductors, for propagating an azimuthal traveling wave having circumferential electric field components extending between adjacent conductors along a curved path along said array of conductors with a predetermined angular phase velocity, the electrical length of the radio frequency path between adjacent conductors being about one-half wavelength of the operating frequency of said tube; means, including a cathode adjacent to one end and outside of said array for projecting longitudinally therealong a hollow stream of helically traveling electrons having an angular velocity substantially equal to said predetermined angular velocity of said wave for interaction with said circumferential electric field components; and input and output means coupled to said propagating means at opposite ends of said array.

3. A traveling wave amplifier tube as in claim 2, further comprising an elongated conductor axially disposed within said curved array and said electron stream.

4. A tube as in claim 2, wherein said conductors are positioned in a helical array of given diameter and pitch, whereby said wave is constrained to follow a helical path along said array of conductors with predetermined axial and angular phase velocities, and said projecting means is adapted to project electrons along said helical path with axial and angular velocities substantially equal to the corresponding velocities of said wave.

5. A tube as in claim 2, wherein said conductors are positioned in a cylindrical array of axially coextensive conductors.

6. A tube as in claim 2, wherein said wave propagating means further includes a delay line to which said conductors are coupled at uniformly spaced points therealong.

7. A tube as in claim 6, wherein said delay line is a helical conductor within which said conductors are coaxially positioned.

8. A tube as in claim 2, wherein said projecting means comprises a cathode positioned axially of said array, means for establishing an axial magnetic field throughout said tube and means for imparting velocity components to electrons from said cathode in directions transverse to said magnetic field.

9. A magnetron traveling wave tube structure comprising hollow wave guiding means for propagating an azimuthal traveling wave along a curved path with a predetermined angular phase velocity, a non-emitting conductor extending longitudinally within said hollow means, and means including a cathode adjacent to one end and outside of said hollow means and axial magnetic field means extending along said hollow means for projecting longitudinally therethrough a hollow stream of electrons having helical motion in the space between said conductor and said hollow means with substantially the same angular velocity as said wave, said hollow means having input and output coupling means at opposite ends of said hollow wave guiding means.

10. A traveling wave amplifier tube structure adapted to be excited by a signal from a signal source, and comprising means for propagating within said tube and along a helical path a traveling wave having a predetermined angular phase velocity and representing said signal, means adjacent to one end and outside of said wave propagating means for producing a helically traveling stream of electrons in a path adjacent to said helical path, said propagating means including a series of vanes disposed along the path of said electrons for grouping some of said electrons into in-phase components having an angular phase velocity substantially equal to said angular phase velocity of said wave, whereby said traveling wave extracts energy from said in-phase components thereby producing amplification of said signal.

11. An azimuthal traveling wave amplifying tube adapted to be excited by a signal applied to said tube, and comprising means including a helix for propagating within said tube a traveling wave with an azimuthal velocity around a predetermined axis, means adjacent to said helix for producing a magnetic field substantially parallel to said axis, means adjacent to one end of said structure for producing a stream of electrons with a predetermined component of velocity in a plane normal to said axis, said magnetic field being of a predetermined intensity relative to the velocity of said stream of electrons, for directing electrons from said stream into a helical path adjacent to said helix, said propagating means including a plurality of vanes having field forming surfaces coupled to said helix for grouping electrons within said stream into substantially in-phase and out-of-phase groups, whereby the electrons in said in-phase groups transfer their energy to said wave thereby producing amplification of said signal.

12. An azimuthal traveling wave structure having an input and an output and being adapted to be excited by a signal applied to said input, said structure having means including a helix connected at opposite ends thereof to said input and output for propagating within said structure an azimuthal wave with a predetermined angular phase velocity in a helical path in a direction along a predetermined axis, means adjacent to only one end of said helix for producing a stream of electrons with a helical path of travel in a direction along said axis, said propagating means including means for grouping electrons in said stream into in-phase groups, said grouping means comprising a plurality of helically oriented field forming vanes coupled to said helix at points thereon corresponding to $\pi$ mode nodes for the phase velocity of said azimuthal wave, whereby energy from said in-phase groups of electrons is transferred to said wave and to said output.

13. An amplifying device adapted to be excited by a signal and comprising an evacuated envelope, wave propagating means including a helical conductor within said envelope, an input and an output connected to opposite ends of said conductor, said means being adapted to propagate a signal therealong with a predetermined axial and azimuthal phase velocity in the form of a helically-traveling wave, means within said envelope and adjacent to said end of said helical conductor having said input means for producing a stream of electrons with a prescribed axial component of velocity along a predetermined axis and a predetermined component of velocity in a plane normal to said axis, means adjacent to said envelope for producing within said device a magnetic field substantially parallel to said predetermined axis for giving said stream of electrons a predetermined azimuthal velocity around said predetermined axis, said stream of electrons having an axial and azimuthal velocity substantially equal to the axial and azimuthal velocity of said helically-traveling wave propagated on said conductor, said propagating means including a series of helically oriented field forming vanes coupled to said conductor at predetermined points thereon for producing within said stream of electrons in-phase groups, whereby interaction occurs between said in-phase groups of electrons and said helically-traveling wave for effecting a transfer of energy from said stream of electrons through said helical conductor to said output.

14. An amplification device comprising a traveling wave tube structure adapted to propagate therethrough a helically-traveling wave having a predetermined angular phase velocity with a predetermined linear component of velocity along a predetermined axis, said traveling wave structure having a source of electrons at only one end and outside of said structure, said source including a cathode and accelerating means near said cathode for directing said electrons from said source into said structure with a linear component of velocity along said axis which is substantially equal to said linear component of velocity of said helically-traveling wave and with a component of velocity perpendicular to said axis, means adjacent to said structure for establishing a longitudinal magnetic field therein for directing said electrons in a helical path around said axis and adjacent to said wave with an angular velocity substantially equal to said angular velocity, said structure including helically oriented vanes for separating some of said electrons into substantially in-phase groups having an angular velocity substantially equal to said angular velocity of said wave and a non-emitting conductor positioned along said axis for collecting out-of-phase groups of electrons, whereby interaction is effected between said in-phase groups and said wave producing amplification of said wave.

15. A traveling wave amplifying tube adapted to be excited by a signal, and comprising an evacuated envelope having an input and an output at opposite ends thereof; wave propagating means including a helical conductor within said tube and connected to said input at one end thereof and to said output at the other end, said means defining an axis therethrough and being adapted to propagate within said tube a helically oriented traveling wave representing said signal, said wave having a predetermined angular phase velocity with $\pi$ mode nodes; means for producing a stream of electrons within said tube and including a cylindrical cathode coaxial with said axis and at the end of said tube adjacent to said input, said cathode having an outer surface with an electron emissive coating thereon, a first anode for accelerating electrons from said emissive coating in planes normal to said axis, and a second anode for directing said electrons in a direction along said axis; means for guiding said stream of electrons in a helical path within said conductor and around said axis with a predetermined azimuthal velocity in a direction toward the end of said tube remote from said cathode, said guiding means including means for producing a substantially uniform magnetic field with a portion thereof parallel to said axis and within said helical conductor; said propagating means including grouping means coupled to said conductor for separating a prescribed group of said helically traveling stream of electrons into groups including substantially in-phase components having a path of travel substantially adjacent to said conductor, said grouping means comprising a plurality of field forming vanes coupled to said conductor at points thereon corresponding to said $\pi$ mode nodes for said wave within said tube, whereby energy from said in-phase components is transferred to said wave thereby producing amplification of said signal.

16. A traveling wave tube adapted to be excited by a signal having a predetermined phase velocity, and comprising an evacuated envelope having an input and an output at opposite ends thereof; wave propagating means including a helix within said tube and connected to said input at one end thereof and to said output at the other end, said means being adapted to propagate within said tube a helically oriented traveling wave representing said signal and with a predetermined angular phase velocity and having a wave field around said helix, said helix having points thereon corresponding to regions of opposite polarity for said wave; means for producing a stream of electrons and including a hollow cathode coaxial with a predetermined axis, said cathode having an inside surface with an electron emissive coating on said surface, and an accelerating anode having an aperture therethrough and spaced along said axis from said cathode and coaxial therewith for accelerating electrons from said electron emissive surface through said aperture with components of velocity in a direction along said axis and components of velocity in a direction along planes normal to said axis; means for guiding said stream of electrons in a helical path within said helix and around said axis with a predetermined azimuthal velocity in a direction toward the end of said tube remote from said cathode, said guiding means comprising means for producing a magnetic field with a portion thereof parallel to said axis and within said helix; said propagating means including grouping means coupled to said helix for separating from said helically-traveling stream of electrons substantially in-phase groups of electrons having a path of travel substantially within said wave field, said grouping means comprising a plurality of field forming vanes coupled to said helix at said points thereon corresponding to said regions of opposite polarity; and collecting means at the end of said tube remote from said cathode for returning a predetermined portion of said stream of electrons to said cathode, whereby energy from said in-phase components is transferred to said wave and to said output.

References Cited in the file of this patent

UNITED STATES PATENTS

| | | |
|---|---|---|
| 2,424,965 | Brillouin | Aug. 5, 1947 |
| 2,524,252 | Brown | Oct. 3, 1950 |
| 2,591,350 | Gorn | Apr. 1, 1952 |
| 2,608,668 | Hines | Aug. 26, 1952 |
| 2,640,951 | Kuper | June 2, 1953 |
| 2,679,615 | Bowie | May 25, 1954 |
| 2,752,523 | Goodall | June 26, 1956 |
| 2,802,135 | Dodds | Aug. 6, 1957 |
| 2,812,467 | Kompfner | Nov. 5, 1957 |

FOREIGN PATENTS

| | | |
|---|---|---|
| 153,259 | Australia | Sept. 17, 1953 |